United States Patent [19]

Anthon

[11] Patent Number: 5,609,286
[45] Date of Patent: Mar. 11, 1997

[54] BRAZING ROD FOR DEPOSITING DIAMOND COATING METAL SUBSTRATE USING GAS OR ELECTRIC BRAZING TECHNIQUES

[76] Inventor: Royce A. Anthon, 3909 W. 8700 South, West Jordan, Utah 84088

[21] Appl. No.: 520,160

[22] Filed: Aug. 28, 1995

[51] Int. Cl.$^6$ .......................................................... C08J 5/14
[52] U.S. Cl. .......................... 228/56.3; 228/124.1; 51/309
[58] Field of Search ............................. 228/122.1, 124.1, 228/56.3; 219/76.14; 427/180; 76/DIG. 12; 51/309, 293

[56] References Cited

U.S. PATENT DOCUMENTS

| | | | |
|---|---|---|---|
| 3,650,714 | 3/1972 | Farkas | 228/124.1 |
| 3,986,842 | 10/1976 | Quaas | 219/76.14 |
| 4,048,705 | 9/1977 | Blanpain et al. | 228/56.3 |
| 4,117,968 | 10/1978 | Naidich et al. | 76/DIG. 12 X |
| 4,770,907 | 9/1988 | Kimura | 427/217 |
| 5,425,288 | 6/1995 | Evans | 76/DIG. 12 |

*Primary Examiner*—Kenneth J. Ramsey
*Attorney, Agent, or Firm*—Terry M. Crellin

[57] ABSTRACT

A brazing rod is disclosed for use in depositing an abrasive metal coating on a metal substrate. The brazing rod comprises an elongate metal tube made of a metal selected from the group consisting of copper, bronze, brass, nickel, nickel alloys, iron, cobalt and steel. A brazing mixture is contained in the metal tube and comprises a particulate abrasive material selected from the group consisting of diamond particles and mixtures of diamond particles and carbide particles. The brazing mixture further contains powdered braze alloy in which one component of the braze alloy is a member selected from the group consisting of nickel, nickel alloy, silver, silver alloy, gold, gold alloy, copper, copper alloy and mixtures thereof, and in which a second component of said braze alloy is selected from the group consisting of iron, iron alloy, cobalt, cobalt alloy, tin, tin alloy, boron, silicon, chromium, chromium alloy and mixtures thereof. The diamond particles contained in the brazing mixture are coated with a material selected from the group consisting of tungsten, molybdenum, chromium, nickel, iron, cobalt, palladium, tungsten carbide, molybdenum carbide, chromium carbide and iron carbide. The carbide particles contained in the brazing mixture are selected from the group consisting of tungsten carbide, molybdenum carbide and chromium carbide.

8 Claims, 1 Drawing Sheet

BRAZING ROD FOR DEPOSITING DIAMOND COATING METAL SUBSTRATE USING GAS OR ELECTRIC BRAZING TECHNIQUES

BACKGROUND OF THE INVENTION

1. Field of the Invention

The present invention relates broadly to the application of a hard, abrasive coating to a metal substrate. In particular, the invention relates to means and methods for applying a coating comprising diamonds to a metal substrate using conventional gas and electric welding or brazing techniques.

2. State of the Art

It has been known to apply a hardfacing to a metal substrate by brazing a coating containing carbide particles such as tungsten carbide to the metal substrate. Brazing rods are available commercially that can be used to braze a coating containing carbide particles to a metal substrate. A & B Metal Mfg. Company, Inc. of Houston Tex. and Kennametal Inc. of Latrobe, Pa. produce and sell tungsten carbide brazing rods. The tungsten carbide brazing rods are used to apply a coating of abrasive material to drilling tools to increase their life. The drilling tools are commonly made with a diamond cutting surface. When the diamond surface becomes impaired, such as by loss of diamond particles, the coating of carbide particles to the tool will increase its life somewhat. It would be highly advantageous and desirable if the diamond coating could be replaced on the tool. The tool would then be capable of its full cutting ability.

There has been no suggestion in the prior art of being able to braze a coating containing diamond particles to a metal substrate such as a drilling tool. There are various processes that are known used for depositing a layer of braze containing diamond particles on a metal substrate. All such methods universally require controlled heating of the substrate in a vacuum furnace. There is no suggestion of brazing a coating of braze material containing diamond particles on the metal substrate using conventional gas or electric welding and brazing techniques.

In U.S. Pat. No. 5,100,045 issued to Ronald C. Wiand on Mar. 31, 1992, a method of reconditioning brazed diamond abrasive tools is disclosed. It is recognized in that patent that it would be highly desirable to be able to recondition or repair brazed diamond abrasive tools. Unfortunately, the method taught in U.S. Pat. No. 5,100,045 the tool that is repaired is placed in a vacuum furnace and heated to a temperature of about 1900° F. or at least about 70° F. above the liquid melting point or flow point of the braze. The old braze becomes thermoplastic and the diamond particles reorient to present new abrading edges. If the tool has bare or bald spots on the tool, i.e., spots where the original diamond particles have broken away and are no longer present, new brazing powder and a binder are mixed to form a brazing paste which is placed on the tool to cover the bald spots prior to the heating of the tool in the furnace. Diamond particles are placed on the paste, and then the tool is heated in the vacuum furnace. The new and old braze becomes thermoplastic and the old and new diamonds reorient to present abrading edges and the brazes flow together. There is no suggestion of using a braze rod containing a braze and diamond particles, wherein the braze is applied directly to the surface of the tool using conventional gas and electric welding and brazing techniques.

OBJECTIVES AND BRIEF DESCRIPTION OF THE INVENTION

A principal objective of the invention is to provide a novel, brazing rod for use in depositing an abrasive coating of diamond particles on a metal substrate.

A particular objective of the present invention is to provide such a brazing rod that can be used to deposit a coating of braze and diamond particles directly to the surface of the metal substrate using conventional gas and electric welding and brazing techniques.

The above objectives are achieved in accordance with the present invention by providing a novel, unique brazing rod comprising an elongate metal tube that is filled with a braze mixture having diamond particles distributed throughout the braze mixture. The diamond particles must be coated with a material selected from the group consisting of tungsten, molybdenum, chromium, nickel, iron, cobalt, palladium, tungsten carbide, molybdenum carbide and chromium carbide before the diamond particles are mixed with the brazing mixture and introduced into the metal tube.

It has been found that the brazing rod of the present invention can be used in conventional gas and electric welding and brazing procedures to deposit a coating of the braze and diamond particles to the surface of a metal substrate. It has been unexpectedly found that the coated diamonds will not float in the braze material as the braze is being welded or brazed onto the metal substrate. The coated diamonds remain dispersed in the liquid braze material as the liquid braze material flows onto the metal substrate.

When using uncoated diamonds, the diamond particles float to the top of the liquid braze as the braze flows onto the metal substrate. When the diamond particles float to the surface of the liquid braze, they are not satisfactorily secured by the braze to the metal substrate and are easily broken away from the tool when the tool is used in an abrading process. The tool to which uncoated diamonds have been brazed using a brazing rod containing the uncoated diamonds is totally useless. In contrast, the coated diamonds are distributed through the braze material as the liquid braze flows onto the metal substrate, and the diamonds are firmly embedded in the braze material. As the tool is used, the braze material tends to wear slightly away exposing working edges of the diamond particles.

The novel, brazing rod of the present invention is especially useful in repairing damaged tools in the field. A damaged drill bit, for example, can easily and quickly be repaired at the drilling site. The repaired tool can then be immediately placed back in service. Heretofore, the damaged drill bit had to be sent back to the manufacturer for extensive repairs at the manufacturer's manufacturing facilities. Unless a second, replacement drill bit was available, drilling work in the field would have to stop until the repaired drill bit or a new drill bit was received from the manufacturer. By using the novel, brazing rods of the present invention, the damaged drill bit can be repaired immediately and put back in immediate service. It should also be recognized that the novel, brazing rods of the present invention can be used to manufacture new tools if so desired.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which:

FIG. 1 is a cross-sectional representation of a brazing rod in accordance with the present invention; and FIG. 2 is a schematic, cross-sectional, representation of the brazing rod of FIG. 1 being used to deposit a braze coating containing diamond particles to a substrate metal.

DETAILED DESCRIPTION OF THE ILLUSTRATED EMBODIMENTS

Figure 1:
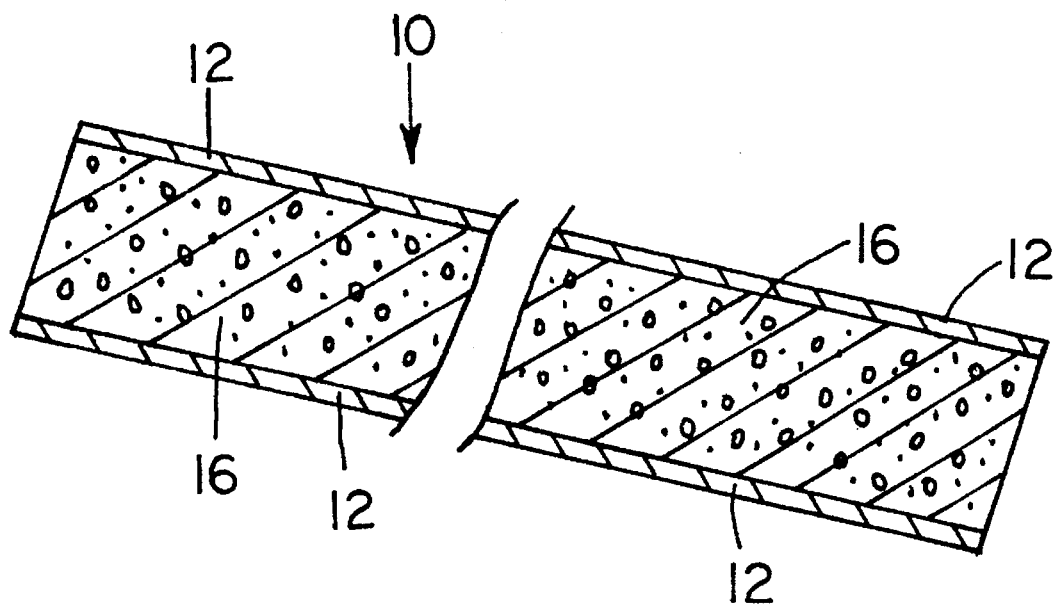

A brazing rod 10 for use in depositing an abrasive metal coating on a metal substrate in accordance with the present invention is shown in FIG. 1 of the drawings. The metal coating that is to be deposited by use of the brazing rod 10 contains an abrasive material selected from the group consisting of diamond particles and mixtures of diamond particles and carbide particles.

As shown, the brazing rod comprises an elongate metal tube 12 made of a metal selected from the group consisting of copper, bronze, brass, nickel, nickel alloys, iron, cobalt and steel. A brazing mixture 16 is contained in the metal tube 12. The brazing mixture comprises a powdered braze alloy in which a particulate abrasive material is disposed. The particulate abrasive material is selected from the group consisting of diamond particles and mixtures of diamond particles and carbide particles.

It is essential that the diamond particles be coated with a material selected from the group consisting of tungsten, molybdenum, chromium, nickel, iron, cobalt, palladium, tungsten carbide, molybdenum carbide and chromium carbide. The carbide particles are selected from the group consisting of tungsten carbide, molybdenum carbide, chromium carbide and iron carbide.

The powdered braze alloy comprises at least two components. One component of the braze alloy is a member selected from the group consisting of nickel, nickel alloy, silver, silver alloy, gold, gold alloy, copper, copper alloy and mixtures thereof. The second component of the braze alloy is selected from the group consisting of iron, iron alloy, cobalt, cobalt alloy, tin, tin alloy, boron, silicon, chromium, chromium alloy and mixtures thereof.

In a preferred embodiment of the brazing rod 10 of the present invention, the brazing mixture contained in the metal tube 12 further comprises a finely divided, particulate material selected from the group consisting of tin, silver, brass, lead, cadmium, indium and mixtures thereof. The diamond particles are preferably coated with a material selected from the group consisting of tungsten, molybdenum, chromium, tungsten carbide, molybdenum carbide and chromium carbide. In accordance with a particularly preferred embodiment of the invention, the particulate abrasive material consists essentially of diamond particles which have been coated as specified above.

The brazing rod 10 of the present invention is produced by first coating diamond particles with a material selected from the group consisting of tungsten, molybdenum, chromium, nickel, iron, cobalt, palladium, tungsten carbide, molybdenum carbide, chromium carbide and silicon carbide. The coated, diamond particles are then mixed with a powdered braze alloy to form a braze mixture 16.

The braze alloy has at least two components. One component is a member selected from the group consisting of nickel, nickel alloy, silver, silver alloy, gold, gold alloy, copper, copper alloy and mixtures thereof. The second component of the braze alloy is selected from the group consisting of iron, iron alloy, cobalt, cobalt alloy, tin, tin alloy, chromium, chromium alloy and mixtures thereof. The braze mixture 16 is then introduced into the core of an elongate, metal tube 12 that is made of a metal selected from the group consisting of copper, bronze, brass, nickel, nickel alloys, iron, cobalt and steel.

In a preferred embodiment of the present invention, finely divided, particulate material selected from the group consisting of tin, silver, brass, lead, cadmium, indium and mixtures thereof is mixed with the coated diamond particles and powdered brazing alloy in making the braze mixture 16 that is introduced into the metal tube 12. Supplemental abrasive particles can be added to the braze mixture 16 together with the diamond particles if so desired. The supplemental abrasive particles are selected from the group consisting of tungsten carbide, molybdenum carbide, and chromium carbide.

Figure 2:
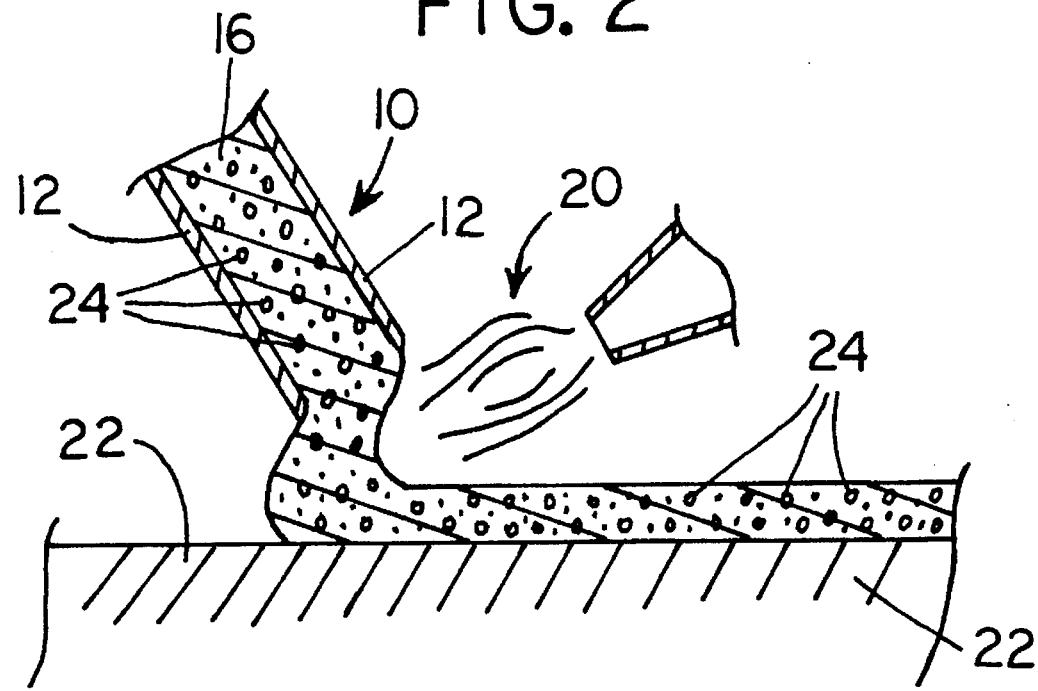

It has been unexpectedly found that the brazing rods 10 of the present invention can be used with conventional gas or electric brazing and welding techniques to apply a braze coating containing diamonds to a metal substrate. As shown in FIG. 2, the braze rod 10 can be used with a gas flame. The flame 20 is directed to the distal end of the rod 10 and onto the metal substrate.

The flame 20 heats the metal substrate 22 and melts the tip of the metal tube 12 of the rod 10. The powdered bronze alloy contained in the braze mixture 16 in the metal tube 12 melts with the melting of the tip of the metal tube 12. The melted braze mixture 16 and the metal of the metal tube 12 flow onto and wet the surface of the metal substrate 22.

The coated diamond particles 24 (FIG. 2) flow with the liquified braze material 16, and when the braze material 16 solidifies on the metal substrate 22, the coated diamond particles 24 are unexpected found to be substantially uniformly distributed through the braze coating. If uncoated diamonds are employed in the braze mixture 16 of the braze rod 10, instead of coated diamonds in accordance with the present invention, the uncoated diamonds float to the exposed surface of the braze coating before the braze material solidifies and are not adequately bonded to the braze coating and thus the metal substrate 22.

The brazing rods 10 of the present invention are highly desirable for being used in repairing and reconditioning diamond faced tools. The tools, such as drilling bits, can be repaired and reconditioned in the field. For example, a drilling bit can be repaired by brazing a coating of diamonds on the worn or damaged bit to replace the diamonds that have been lost from the surface of the bit by wear or other damage to the bit. Using the brazing rods 10 of the present invention, a braze coating of diamonds is quickly and inexpensively brazed on the damaged or worn surfaces of the drill bit in the field. The drill bit need not be shipped to a repair facility but instead can be repaired quickly in the field and then returned immediately to service.

The invention will be further illustrated by the following examples:

EXAMPLE 1

Diamond particles can be coated by any of numerous methods known in the art. U.S. Pat. Nos. 3,371,840 and 4,770,907 disclose methods of coating diamond grit with various coatings applicable in the present invention. In this example, diamond particles were coated by placing the diamond grit in a stainless steel crucible together with a salt mixture consisting of equal parts sodium chloride, potassium chloride and calcium chloride. Powdered chromium metal in an amount of about 0.5% based on the salt mixture, was added to the crucible along with the diamond grit in which the diamond particles had a size of −30+40 mesh. The crucible containing the salt mixture, chromium metal and diamond grit was heated in a furnace to a temperature of 1000° C. for 2 hours to coat the diamond particles with a coating consisting of chromium carbide.

A braze mixture was made by mixing 1 gram of the chromium carbide coated diamonds with 2 grams of a commercially available braze powder (LM braze powder from Wall Colmonoy Corporation). The braze mixture also had 1 gram silver flake, 2 grams bronze powder, 1 gram tin powder and 1 gram flux mixed therewith.

The braze mixture was then introduced into the core of a copper tube to make a braze rod. The copper tube was 12 inches in length and had an internal diameter of 5/32 inch. The core of the copper tube was filled substantially uniformly throughout the length of the tube.

The braze rod consisting of the copper tube containing the braze mixture was used to braze a braze coating on a steel substrate. The copper tube braze rod was relatively easy to use. The braze coating had coated diamond particles distributed substantially uniformly through the braze coating. The coated diamonds did not float or migrate to the exposed surface of the braze coating, and unlimited layers of the braze coating could be layered down without the diamonds floating and disbonding from the deposit.

EXAMPLE 2

The procedure of Example 1 was followed with the sole exception that the braze mixture was introduced into the core of a brass tube to make a braze rod. The brass tube was 12 inches in length and had an internal diameter of 5/32 inch. The core of the brass tube was filled substantially uniformly with the braze mixture.

The braze rod consisting of the brass tube containing the braze mixture was used to braze a braze coating on a steel substrate. The braze coating had coated diamond particles distributed substantially uniformly through the coating. The coated diamonds did not float or migrate to the exposed surface of the braze coating. The brass tube brazing rod was not quite as easy to use as the copper tube brazing rod.

EXAMPLE 3

The procedure of Example 1 was followed with the sole exception that the braze mixture was introduced into the core of a stainless steel tube to make a braze rod. The steel tube was 12 inches in length and had an internal diameter of 5/32 inch. The core of the steel tube was filled substantially uniformly with the braze mixture.

The braze rod consisting of the steel tube containing the braze mixture was used to braze a braze coating on a steel substrate. The braze coating had coated diamond particles distributed substantially uniformly through the coating. The coated diamonds did not float or migrate to the exposed surface of the braze coating.

The steel tube brazing rod was more difficult to use than either the brazing rods made from copper or brass tubes. The reason was that the steel had a melting temperature that was somewhat higher than the melting temperature of the braze material contained in the steel rod. A skilled welder was however able to use the brazing rod made from the stainless steel tube. The skilled welder thought that the use of the stainless steel tube would have been easier if very thin walled tubing had been employed in making the brazing rod.

EXAMPLE 5

A copper brazing rod produced in accordance with the procedure given in Example 1 was used to apply a braze coating to the end of a piece of steel pipe. The pipe had an exterior diameter of ¾ inch. The end of the pipe was uniformly coated with a braze, and the diamond particles in the braze were substantially uniformly distributed through the braze coating.

The pipe was secured in the chuck of a drill press so that the coated end of the pipe could be forced into contact with an item to be drilled. The pipe was used to drill holes through various types of rocks. A small amount of water coolant was sprayed on the rocks as they were being drilled.

The pipe successfully drilled through a piece of obsidian rock that was two inches in thickness and a piece of agate rock that was one inch in thickness. The pipe was used to drill holes in numerous additional rocks of less hardness than obsidian and agate. After numerous drillings, the end of the pipe still had its braze coat intact and in its original condition. The pipe was capable of many additional drillings.

Although a preferred embodiment of a braze rod of the present invention has been illustrated and described, it is to be understood that the present disclosure is made by way of example and that various other embodiments are possible without departing from the subject matter coming within the scope of the following claims, which subject matter is regarded as the invention.

I claim:

1. A brazing rod for use in depositing an abrasive metal coating on a metal substrate, wherein the metal coating contains an abrasive material selected from the group consisting of diamond particles and mixtures of diamond particles and carbide particles, said brazing rod comprising an elongate metal tube made of a metal selected from the group consisting of copper, bronze, brass, nickel, nickel alloys, iron, cobalt and steel; and a brazing mixture contained in said metal tube, said brazing mixture comprising a particulate abrasive material selected from the group consisting of diamond particles and mixtures of diamond particles and carbide particles; and powdered braze alloy in which one component of the braze alloy is a member selected from the group consisting of nickel, nickel alloy, silver, silver alloy, gold, gold alloy, copper, copper alloy and mixtures thereof, and in which a second component of said braze alloy is selected from the group consisting of iron, iron alloy, cobalt, cobalt alloy, tin, tin alloy, boron, silicon, chromium, chromium alloy and mixtures thereof, wherein (a) the diamond particles have been coated with a material selected from the group consisting of tungsten, molybdenum, chromium, nickel, iron, cobalt, palladium, tungsten carbide, molybdenum carbide, chromium carbide and iron carbide, and (b) the carbide particles are selected from the group consisting of tungsten carbide, molybdenum carbide and chromium carbide.

2. A brazing rod in accordance with claim 1 wherein said brazing mixture contained in said metal tube further comprises a finely divided, particulate material selected from the group consisting of tin, silver, brass, lead, cadmium, indium and mixtures thereof.

3. A brazing rod in accordance with claim 2 wherein the diamond particles have been coated with a material selected from the group consisting of tungsten, molybdenum, chromium, titanium, niobium, zirconium, tungsten carbide, molybdenum carbide, chromium carbide, titanium carbide, niobium carbide and zirconium carbide.

4. A brazing rod in accordance with claim 3 wherein said brazing mixture contained in said metal tube further comprises a finely divided, particulate material selected from the group consisting of tin, silver, brass, lead, cadmium, indium and mixtures thereof.

5. A brazing rod in accordance with claim 4 wherein the particulate abrasive material consists essentially of diamond particles.

6. A method of making a brazing rod for use in depositing a metal coating on a metal substrate, wherein the metal coating contains diamond particles, said method comprising (a) coating diamond particles with a material selected from the group consisting of tungsten, molybdenum, chromium, nickel, iron, cobalt, palladium, tungsten carbide, molybdenum carbide and chromium carbide;

(b) mixing the coated, diamond particles from step (a) with a powdered braze alloy in which one component of the braze alloy is a member selected from the group consisting of nickel, nickel alloy, silver, silver alloy, gold, gold alloy, copper, copper alloy and mixtures thereof, and in which a second component of said braze alloy is selected from the group consisting of iron, iron alloy, cobalt, cobalt alloy, tin, tin alloy, boron, silicon, chromium, chromium alloy and mixtures thereof; and (c) filling the core of an elongate, metal tube with the mixture from step (b), wherein said metal tube is made of a metal selected from the group consisting of copper, bronze, brass, nickel, nickel alloys, iron, cobalt and steel.

7. A method of making a brazing rod in accordance with claim 6 wherein a finely divided, particulate material selected from the group consisting of tin, silver, brass, lead, cadmium, indium and mixtures thereof is mixed with the coated diamond particles and powdered brazing alloy in step (b).

8. A method of making a brazing rod in accordance with claim 6 wherein abrasive particles selected from the group consisting of tungsten carbide, molybdenum carbide and chromium carbide are mixed with the coated diamond particles and powdered brazing alloy in step (b).

* * * * *